United States Patent
Kim

(10) Patent No.: US 8,630,783 B2
(45) Date of Patent: Jan. 14, 2014

(54) DISTANCE CONTROL SYSTEM OF VEHICLE

(75) Inventor: Hyun Wook Kim, Suwon-si (KR)

(73) Assignee: MANDO Corporation, Pyeongtaek-si, Gyeonggi-do (KR)

( * ) Notice: Subject to any disclaimer, the term of this patent is extended or adjusted under 35 U.S.C. 154(b) by 196 days.

(21) Appl. No.: 13/228,121

(22) Filed: Sep. 8, 2011

(65) Prior Publication Data

US 2012/0059564 A1    Mar. 8, 2012

(30) Foreign Application Priority Data

Sep. 8, 2010 (KR) .................. 10-2010-0088090

(51) Int. Cl.
*G01S 13/58* (2006.01)
*B60W 30/16* (2012.01)

(52) U.S. Cl.
USPC .............................. 701/96; 701/300; 340/435

(58) Field of Classification Search
USPC ............. 701/96, 93, 300, 301; 340/903, 435, 340/436; 342/109, 104, 72, 118; 180/167
See application file for complete search history.

(56) References Cited

U.S. PATENT DOCUMENTS

| | | | | |
|---|---|---|---|---|
| 6,070,682 A | * | 6/2000 | Isogai et al. ............... | 180/167 |
| 8,164,511 B2 | * | 4/2012 | Kishida et al. ............. | 342/112 |
| 2001/0039471 A1 | * | 11/2001 | Bienias et al. .............. | 701/96 |
| 2004/0118624 A1 | * | 6/2004 | Beuhler et al. ............. | 180/167 |
| 2008/0291078 A1 | * | 11/2008 | Hilsebecher et al. ....... | 342/70 |

* cited by examiner

*Primary Examiner* — Tan Q Nguyen
(74) *Attorney, Agent, or Firm* — McDermott Will & Emery LLP

(57) ABSTRACT

A distance control system of a vehicle includes: a signal transmitter for transmitting wireless signals forward with respect to a distance-controlled vehicle; a signal receiver for receiving the wireless signals reflected and returned from an object vehicle; a relative velocity measuring unit for measuring the relative velocity of the object vehicle in relation to the distance-controlled vehicle on the basis of the received wireless signals; a vehicle-to-vehicle distance measuring unit for measuring a first vehicle-to-vehicle distance between the distance-controlled vehicle and the object vehicle; and a vehicle-to-vehicle distance calculating unit for calculating a third vehicle-to-vehicle distance based on the first vehicle-to-vehicle distance and a second vehicle-to-vehicle distance calculated from the relative velocity.

11 Claims, 4 Drawing Sheets

FIG.3

|  | GAIN |
|---|---|
| $R\_1^{st} > R\_2^{nd}$ | REDUCING |
| $R\_1^{st} \leq R\_2^{nd}$ | INCREASING |

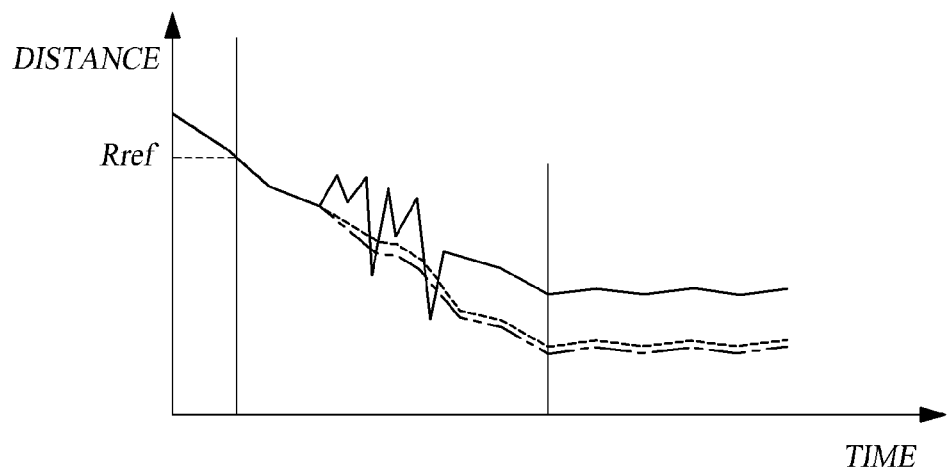

DISTANCE CONTROL SYSTEM OF VEHICLE

CROSS-REFERENCE TO RELATED APPLICATION

This application claims priority from and the benefit under 35 U.S.C. §119(a) of Korean Patent Application No. 10-2010-0088090, filed on Sep. 8, 2010, which is hereby incorporated by reference for all purposes as if fully set forth herein.

BACKGROUND OF THE INVENTION

1. Field of the Invention

The present invention relates to a distance control system of a vehicle.

2. Description of the Prior Art

A distance control system of a vehicle controls a vehicle-to-vehicle distance using information for a distance to an object vehicle. A vehicle-to-vehicle distance is basic information for a distance control system, and as the vehicle-to-vehicle information is more precise, the functional actions of the distance control system can be executed more precisely.

However, if the length or height of an object vehicle is long and/or high like a truck, the distance information of the distance control system may indicate a vehicle-to-vehicle distance as being farther than the real distance to the object vehicle. That is, as shown in FIG. 1, if the height $h_2$ of an object vehicle is high, a conventional distance control system may measure the distance to a part forwardly spaced from the rear end of the object vehicle, by which the measured vehicle-to-vehicle distance $R_2$ may be larger than the real vehicle-to-vehicle distance $R_1$.

If the distance control system uses an incorrectly measured vehicle-to-vehicle distance, a seriously dangerous situation for the driver of the vehicle may occur since the real distance between the distance-controlled vehicle and the object vehicle is closer than the measured distance.

SUMMARY OF THE INVENTION

Accordingly, the present invention has been made to solve the above-mentioned problems occurring in the prior art, and an object of the present invention is to provide a distance control system of a vehicle which can precisely produce vehicle-to-vehicle information.

In order to accomplish this object, there is provided a distance control system of a vehicle, including: a signal transmitter for transmitting wireless signals forward with respect to a distance-controlled vehicle; a signal receiver for receiving the wireless signals reflected and returned from an object vehicle; a relative velocity measuring unit for measuring the relative velocity of the object vehicle in relation to the distance-controlled vehicle on the basis of the received wireless signals; a vehicle-to-vehicle distance measuring unit for measuring a first vehicle-to-vehicle distance between the distance-controlled vehicle and the object vehicle; and a vehicle-to-vehicle distance calculating unit for calculating a third vehicle-to-vehicle distance on the basis of a second vehicle-to-vehicle distance calculated through the relative velocity and the first vehicle-to-vehicle distance.

The relative velocity measuring unit may measure the difference between the frequency of the returned and received signal and the frequency of the wireless signals at the time of transmitting them to calculate the relative velocity.

The vehicle-to-vehicle distance calculating unit may integrate the relative velocity to calculate the second vehicle-to-vehicle distance.

The vehicle-to-vehicle distance calculating unit may calculate the third vehicle-to-vehicle distance through the following equation:

$$R\_3^{rd} = R\_1^{st} * G + R\_2^{nd} * (1-G)$$

wherein $R\_3^{rd}$ is the third vehicle distance, $R\_1^{st}$ is the first vehicle-to-vehicle distance, $R\_2^{nd}$ is the second vehicle-to-vehicle distance, G is a gain for the first vehicle-to-vehicle distance, and (1−G) is a gain for the second vehicle-to-vehicle distance.

If the second vehicle-to-vehicle distance is smaller than the first vehicle-to-vehicle distance, the vehicle-to-vehicle distance calculating unit may reduce the gain for the first vehicle-to-vehicle distance and may increase the gain for the second vehicle-to-vehicle distance, and if the second vehicle-to-vehicle distance is larger than the first vehicle-to-vehicle distance, the vehicle-to-vehicle distance calculating unit may increase the gain for the first vehicle-to-vehicle distance, and may reduce the gain for the second vehicle-to-vehicle distance.

The sum of the gains for the first vehicle-to-vehicle distance and the second vehicle-to-vehicle distance may be 1.

If the first vehicle-to-vehicle distance is equal to or smaller than a reference vehicle-to-vehicle distance, the vehicle-to-vehicle distance calculating unit may calculate the third vehicle-to-vehicle distance on the basis of the first vehicle-to-vehicle distance, and if the first vehicle-to-vehicle distance is larger than the reference vehicle-to-vehicle distance, the vehicle-to-vehicle distance calculating unit may determine the first vehicle-to-vehicle distance as the third vehicle-to-vehicle distance.

According to the present invention as described above, a vehicle-to-vehicle distance can be precisely calculated, whereby safe driving of a vehicle can be assured.

BRIEF DESCRIPTION OF THE DRAWINGS

The above and other objects, features and advantages of the present invention will be more apparent from the following detailed description taken in conjunction with the accompanying drawings, in which:

FIG. 3 shows a change in gain in accordance with the functional action of a vehicle-to-vehicle distance calculating unit of FIG. 2; and FIG. 4 is a graph showing the functional action of the vehicle-to-vehicle distance calculating unit of the distance control system of FIG. 2.

DETAILED DESCRIPTION OF THE PREFERRED EMBODIMENTS

Figure 1:
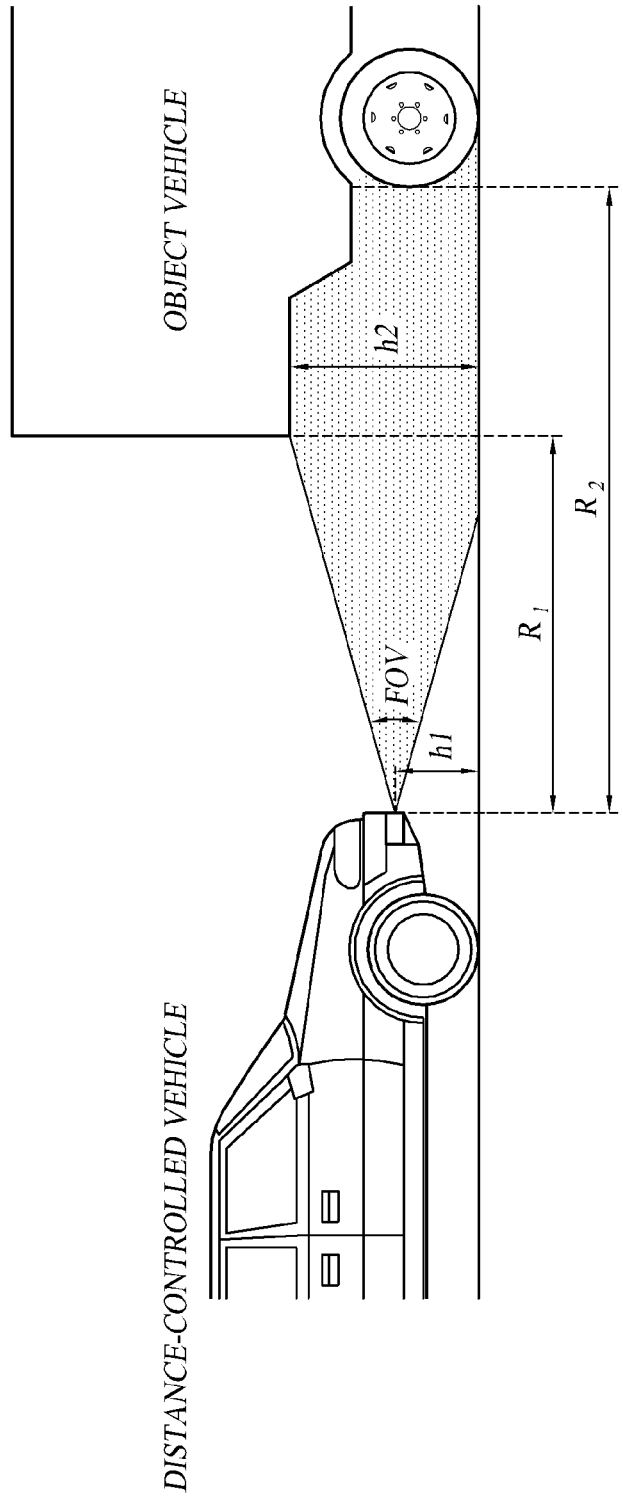
FIG. 1 shows a problem of a conventional distance control system.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
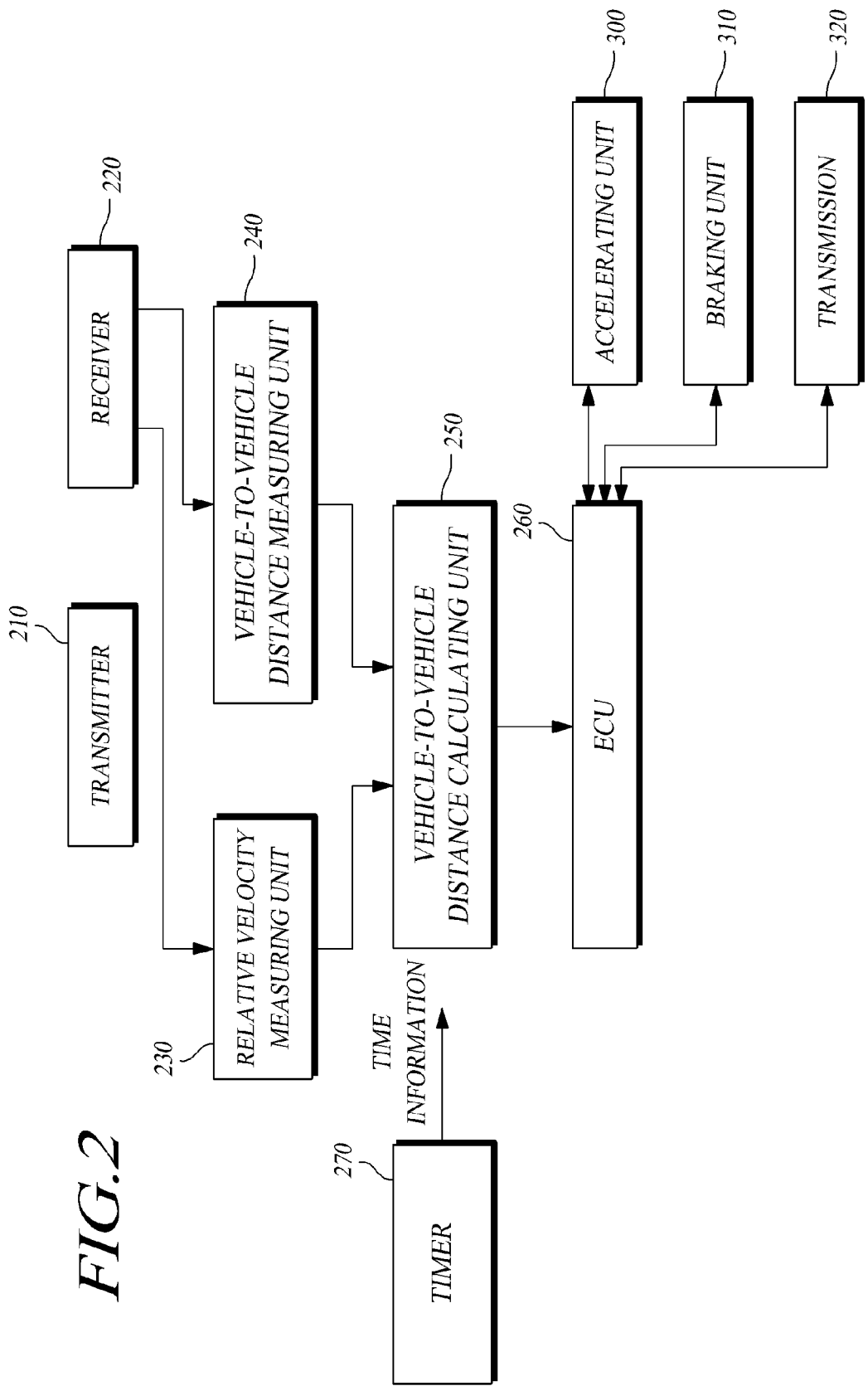
FIG. 2 shows a distance control system of a vehicle in accordance with an embodiment of the present invention.

FIG. 2 shows a distance control system of a vehicle in accordance with an embodiment of the present invention. As shown in FIG. 2, the distance control system includes a signal transmitter 210, a signal receiver 220, a relative velocity measuring unit 230, a vehicle-to-vehicle distance measuring unit 240, a vehicle-to-vehicle distance calculating unit 250, and an ECU (Electronic Control Unit) 260.

The signal transmitter 210 transmits wireless signals, such as laser signals, forward with respect to a distance-controlled vehicle. Although the present embodiment uses laser signals, the present invention is not limited to this and various wireless signals may be used for the present invention.

The signal receiver 220 receives the wireless signals reflected and returned from an object vehicle.

The relative velocity measuring unit 230 measures the relative velocity of the object vehicle in relation to the distance-controlled vehicle on the basis of the received wireless signals. The relative velocity measuring unit 230 may measure the relative velocity using a Doppler method. That, if wireless signals with a specific frequency are transmitted to an object vehicle and reflected by the object vehicle, the frequency of the returned signals is different from that of the signals at the time of transmitting them. The relative velocity measuring unit 230 measures the change in frequency of the wireless signals to calculate the relative velocity of the object vehicle in relation to the distance-controlled vehicle.

The relative velocity provides consistent information even if the position of a part of the object vehicle is changed. For example, even if the height of the object vehicle is high as shown in FIG. 1, the frequency of the wireless signals reflected from the rear end of the object vehicle, or the frequency of the wireless signal reflected from a part forwardly spaced from the rear end of the object vehicle are substantially equal to each other. As a result, the relative velocity measuring unit 230 can measure the relative velocity of the object vehicle in relation to the distance-controlled vehicle even if the sensed part in the object vehicle is changed in terms of position.

The vehicle-to-vehicle distance measuring unit 240 measures a first vehicle-to-vehicle distance $R\_1^{st}$ between the distance-controlled vehicle and the object vehicle. The vehicle-to-vehicle distance measuring unit 240 measures the length of time until the wireless signals are reflected and returned from the object vehicle after they are transmitted toward the object vehicle so as to measure the first vehicle-to-vehicle distance $R\_1^{st}$. The vehicle-to-vehicle distance measuring unit 240 may obtain time information from a timer 270.

The vehicle-to-vehicle distance calculating unit 250 calculates a third vehicle-to-vehicle distance $R\_3^{rd}$, which corresponds to the real vehicle-to-vehicle distance, on the basis of the first vehicle-to-vehicle distance $R\_1^{st}$ input from the vehicle-to-vehicle distance measuring unit 240 and a second vehicle-to-vehicle distance $R\_2^{nd}$ which is calculated through the relative velocity input from the relative velocity measuring unit 230.

The vehicle-to-vehicle distance calculating unit 250 can calculate the second vehicle-to-vehicle distance $R\_2^{nd}$ by integrating the relative velocity. As a result, the vehicle-to-vehicle distance calculating unit 250 may include an integrator for calculating the second vehicle-to-vehicle distance $R\_2^{nd}$. The vehicle-to-vehicle distance calculating unit 250 may obtain time information required for calculating the second vehicle-to-vehicle distance $R\_2^{nd}$ from a timer 270.

The vehicle-to-vehicle distance calculating unit 250 selects a gain in order to calculate the third vehicle-to-vehicle distance $R\_3^{rd}$ on the basis of the first vehicle-to-vehicle distance $R\_1^{st}$ and the second vehicle-to-vehicle distance $R\_2^{nd}$. That is, as shown in FIG. 3, if the second vehicle-to-vehicle distance $R\_2^{nd}$ is smaller than the first vehicle-to-vehicle distance $R\_1^{st}$, the vehicle-to-vehicle distance calculating unit 250 determines that the vehicle-to-vehicle distance measuring unit 240 senses a part forwardly spaced from the rear end of the object vehicle. Therefore, the first vehicle-to-vehicle distance calculating unit 250 reduces the gain for the first vehicle-to-vehicle distance $R\_1^{st}$, and increases the gain for the second vehicle-to-vehicle distance $R\_2^{nd}$.

In addition, if the second vehicle-to-vehicle distance $R\_2^{nd}$ is larger than the first vehicle-to-vehicle distance, the vehicle-to-vehicle distance calculating unit 250 determines that there occurs an integration error in the process of integrating the relative velocity, and the vehicle-to-vehicle distance calculating unit 250 increases the gain for the first vehicle-to-vehicle distance $R\_1^{st}$, and reduces the gain for the second vehicle-to-vehicle distance $R\_2^{nd}$. As the length of time for integrating the relative velocity is increased, the integration error may be increased.

Herein, the sum of the gains of the first vehicle-to-vehicle distance $R\_1^{st}$ and the second vehicle-to-vehicle distance $R\_2^{nd}$ is 1.

As the gains are selected in this manner, the vehicle-to-vehicle distance calculating unit 250 calculates the third vehicle-to-vehicle distance $R\_3^{rd}$ through the following equation:

$$R\_3^{rd}=R\_1^{st}*G+R\_2^{nd}*(1-G)$$

wherein, $R\_3^{rd}$ is the third vehicle-to-vehicle distance, $R\_1^{st}$ is the second vehicle-to-vehicle distance, G is the gain for the first vehicle-to-vehicle distance, and (1−G) is the gain for the second vehicle-to-vehicle distance.

FIG. 4 is a graph showing the functional actions of the vehicle-to-vehicle distance calculating unit of the distance control system of the present embodiment.

If the first vehicle-to-vehicle distance $R\_1^{st}$ input from the vehicle-to-vehicle distance measuring unit 240 is equal to or smaller than the reference vehicle-to-vehicle distance $R_{ref}$, the vehicle-to-vehicle distance calculating unit 250 can calculate the third vehicle distance $R\_3^{rd}$ in accordance with the equation as described above. That is, if the first vehicle-to-vehicle distance $R\_1^{st}$ is larger than the reference vehicle-to-vehicle distance, the error of the first vehicle-to-vehicle distance $R\_1^{st}$ is reduced to a negligible level since most of the wireless signals are reflected by the rear end of the object vehicle and the road on which the object vehicle is positioned.

Through these functional actions, the vehicle-to-vehicle distance calculating unit 250 can reduce the steps of obtaining the real vehicle-to-vehicle distance depending on the situation.

The reference vehicle-to-vehicle distance $R_{ref}$ can be calculated through the FOV (Field of View) (radian) of FIG. 1 and the height $H_2$ of the object vehicle. That is, the reference vehicle-to-vehicle distance $R_{ref}$ equals to $2(h_2-h_1)/\text{FOV}$. Herein, $h_2$ is the height of the object vehicle, and $h_1$ is the height of the transmitter 210 mounted on the distance-controlled vehicle. That is, radian is a ratio of a circular arc in relation to the radius of the arc, and if the amount of the arc is very small as compared to the radius, the arc is nearly a straight line rather than a curve. In such a case, the reference vehicle-to-vehicle distance $R_{ref}$ corresponds to the radius, and the height $h_2$ of the object vehicle corresponds to the sum of one half of the arc and the transmitter mounting height $h_1$.

In the present embodiment, the sum of $2(h_2-h_1)/\text{FOV}$ plus a marginal distance may be considered as the reference vehicle-to-vehicle distance $R_{ref}$. When the marginal distance is summed, the third vehicle-to-vehicle distance $R\_3^{rd}$ is calculated in consideration of the relative velocity before the distance between the distance-controlled vehicle and the object vehicle arrives at $2(h_2-h_1)/\text{FOV}$, whereby the reliability of the third vehicle-to-vehicle distance $R\_3^{rd}$ can be enhanced.

FOV is the wireless signal transmitting range of the transmitter 210, and can be set in advance. In addition, the height $h_2$ of the object vehicle can be set in advance as a specific value rather than being calculated in real time.

As shown in FIG. 4, if the distance between the distance-controlled vehicle and the object vehicle is smaller than the reference vehicle-to-vehicle distance $R_{ref}$, the first vehicle-to-vehicle distance $R\_1^{st}$ becomes unstable, and the distance between the distance-controlled vehicle and the object vehicle is reduced, a part forwardly spaced farther from the rear end of the object vehicle is sensed, whereby the measured distance between the distance-controlled vehicle and the object vehicle becomes larger than the real vehicle-to-vehicle distance. As a result, it can be found that the third vehicle-to-vehicle distance $R\_3^{rd}$ is calculated in accordance with the functional actions of the vehicle-to-vehicle distance calculating unit 250 as in the present embodiment, and the third vehicle-to-vehicle distance $R\_3^{rd}$ is very close to the real vehicle-to-vehicle distance.

The ECU (Electronic Control Unit) 260 receives the input of the third vehicle-to-vehicle distance $R\_3^{rd}$ from the vehicle-to-vehicle distance calculating unit 250 to control an acceleration unit 300, such as a throttle valve or an acceleration pedal actuator, a braking unit 310, such as a brake, or a transmission 320 to change or control the distance between the distance-controlled vehicle and the object vehicle.

As described above, the distance control system of a vehicle in accordance with the present invention precisely calculates the vehicle-to-vehicle distance, whereby the safe driving of the vehicle can be assured.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A distance control system of a vehicle, comprising:
   a signal transmitter for transmitting wireless signals forward with respect to a distance-controlled vehicle;
   a signal receiver for receiving the wireless signals reflected and returned from an object vehicle;
   a relative velocity measuring unit for measuring the relative velocity of the object vehicle in relation to the distance-controlled vehicle based on the received wireless signals;
   a vehicle-to-vehicle distance measuring unit for measuring a first vehicle-to-vehicle distance between the distance-controlled vehicle and the object vehicle; and
   a vehicle-to-vehicle distance calculating unit for calculating a third vehicle-to-vehicle distance based on the first vehicle-to-vehicle distance and a second vehicle-to-vehicle distance calculated from the relative velocity.

2. The distance control system as claimed in claim 1, wherein the relative velocity measuring unit measures the difference between the frequency of the returned and received signal and the frequency of the wireless signals at the time of transmitting them to calculate the relative velocity.

3. The distance control system as claimed in claim 1, wherein the vehicle-to-vehicle distance calculating unit calculates the second vehicle-to-vehicle distance by integrating the relative velocity.

4. The distance control system as claimed in claim 1, wherein the vehicle-to-vehicle distance calculating unit calculates the third vehicle-to-vehicle distance by using an equation, $$R\_3^{rd}=R\_1^{st}*G+R\_2^{nd}*(1-G),$$

wherein $R\_3^{rd}$ is the third vehicle distance, $R\_1^{st}$ is the first vehicle-to-vehicle distance, $R\_2^{nd}$ is the second vehicle-to-vehicle distance, G is a gain for the first vehicle-to-vehicle distance, and (1−G) is a gain for the second vehicle-to-vehicle distance.

5. The distance control system as claimed in claim 4, wherein the sum of the gains for the first vehicle-to-vehicle distance and the second vehicle-to-vehicle distance is 1.

6. The distance control system as claimed in claim 4, wherein if the second vehicle-to-vehicle distance is smaller than the first vehicle-to-vehicle distance, the vehicle-to-vehicle distance calculating unit reduces the gain for the first vehicle-to-vehicle distance and increases the gain for the second vehicle-to-vehicle distance, and if the second vehicle-to-vehicle distance is larger than the first vehicle-to-vehicle distance, the vehicle-to-vehicle distance calculating unit increases the gain for the first vehicle-to-vehicle distance, and reduces the gain for the second vehicle-to-vehicle distance.

7. The distance control system as claimed in claim 1, wherein if the first vehicle-to-vehicle distance is equal to or smaller than a reference vehicle-to-vehicle distance, the vehicle-to-vehicle distance calculating unit calculates the third vehicle-to-vehicle distance based on the first vehicle-to-vehicle distance, and if the first vehicle-to-vehicle distance is larger than the reference vehicle-to-vehicle distance, the vehicle-to-vehicle distance calculating unit determines the first vehicle-to-vehicle distance as the third vehicle-to-vehicle distance.

8. A distance control method of a vehicle, comprising:
   transmitting wireless signals forward with respect to a distance-controlled vehicle;
   receiving the wireless signals reflected and returned from an object vehicle;
   measuring the relative velocity of the object vehicle in relation to the distance-controlled vehicle based on the received wireless signals;
   measuring a first vehicle-to-vehicle distance between the distance-controlled vehicle and the object vehicle; and
   calculating a third vehicle-to-vehicle distance based on the first vehicle-to-vehicle distance and a second vehicle-to-vehicle distance calculated from the relative velocity.

9. The distance control method as claimed in claim 8, wherein the third vehicle-to-vehicle distance is calculated using an equation, $$R\_3^{rd} = R\_1^{st}*G + R\_2^{nd}*(1-G),$$

wherein $R\_3^{rd}$ is the third vehicle distance, $R\_1^{st}$ is the first vehicle-to-vehicle distance, $R\_2^{nd}$ is the second vehicle-to-vehicle distance, G is a gain for the first vehicle-to-vehicle distance, and (1−G) is a gain for the second vehicle-to-vehicle distance.

10. The distance control method as claimed in claim 9, wherein the gain for the first vehicle-to-vehicle distance is decreased and the gain for the second vehicle-to-vehicle distance is increased if the second vehicle-to-vehicle distance is smaller than the first vehicle-to-vehicle distance, and the gain for the first vehicle-to-vehicle distance is increased and the gain for the second vehicle-to-vehicle distance is decreased if the second vehicle-to-vehicle distance is larger than the first vehicle-to-vehicle distance.

11. The distance control method as claimed in claim 8, wherein the third vehicle-to-vehicle distance is calculated based on the first vehicle-to-vehicle distance if the first vehicle-to-vehicle distance is equal to or smaller than a reference vehicle-to-vehicle distance, and the first vehicle-to-vehicle distance is determined as the third vehicle-to-vehicle distance if the first vehicle-to-vehicle distance is larger than the reference vehicle-to-vehicle distance.

\* \* \* \* \*